Oct. 8, 1968  P. G. KEMP  3,404,795
ALL-PLASTIC MILK BOTTLES
Filed Dec. 19, 1966
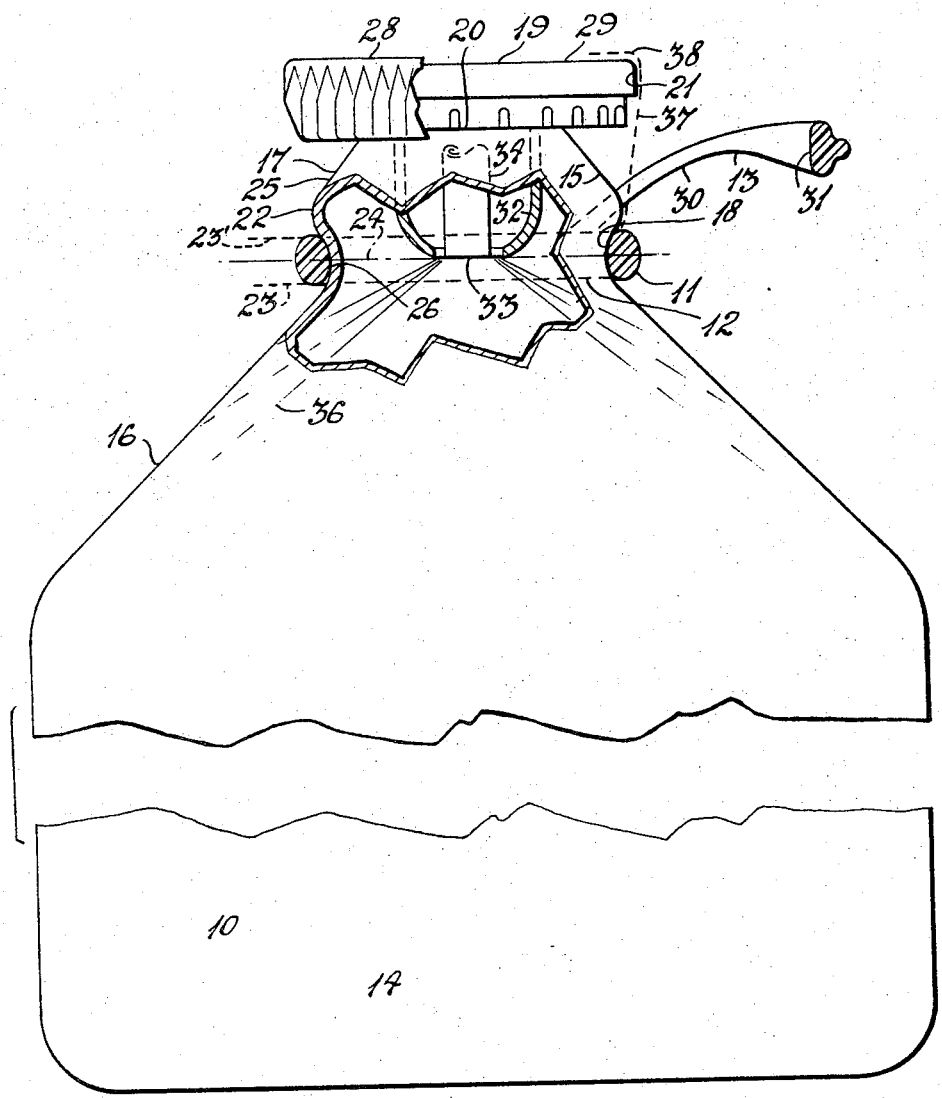
INVENTOR:
Paul G. Kemp
BY  Cecil C. Kent
ATTORNEY United States Patent Office 3,404,795
Patented Oct. 8, 1968

3,404,795
ALL-PLASTIC MILK BOTTLES
Paul G. Kemp, 1881 Huron St.,
London, Ontario, Canada
Continuation-in-part of abandoned application Ser. No. 499,376, Oct. 21, 1965. This application Dec. 19, 1966, Ser. No. 619,879
10 Claims. (Cl. 215—100)

ABSTRACT OF THE DISCLOSURE

A plastic bottle including a frusto-conical neck with an outwardly extending finish having an opening surmounting the neck. The neck including a generally outwardly curved rondure which merges into a reduced dimensioned throat which throat merges downwardly and outwardly with respect to the body of the bottle. A handle including a band is disposed in encompassing and conforming relationship around the throat.

---

The present invention is a continuation-in-part of United States patent application Ser. No. 499,376, filed on Oct. 21, 1965, now abandoned, and relates to an invention comprising the combination, in a plastic milk bottle, of an upper bottle portion which inclines outwardly and downwardly, a neck, and a throat, said neck being surmounted by a finish, the aforesaid parts being so adapted and designed as to perform the novel function of facilitating the suspension and conveyance of plastic milk bottles from a carrying strap, as well as from a pair of spaced and parallel tracks, downwardly depending fingers or any form of machinery.

Another object of the present invention is to provide a plastic milk bottle which is well adapted to fast, efficient, filling by modern machine means, and for mechanical washing with all the speed required by modern methods in full compliance with standards of cleanliness necessary to comply with health regulations.

A still further object of the invention is to provide means, in a plastic milk bottle, which, in addition to other novel features, is well suited to the adhesive attachment thereto of conventional hoods by standard dairy hooding equipment with little or no adaptation of such equipment.

More particularly stated, an important novel feature of the present invention consists of the combination of a plastic milk bottle, and separate but permanently attached carrying band, wherein the interior surfaces of the upper part of the bottle (except the finish) are very close to, conform with, and are substantially parallel with the outer bottle-surfaces in virtue of the thinness of the bottle-wall made possible by the use of plastic, whereby the combined function has been achieved of (i) non-turbulent, fast-filling pouring and washing, and (ii) retention of said handle by its bottle-encircling band the cross-sectional interior contour of which complements the neck, all to the end that while an annular band-receiving constricted throat is provided, the associated internal curvatures are relatively slow or gradual, thus avoiding hard-to-clean, turbulence-causing recesses and variations of thickness in the plastic such as would increase weight and cost.

Further novel features reside in the provision of a plastic milk bottle which is particularly well adapted, in virtue of its exterior conformation in the upper parts thereof, to the secure grasping or holding thereof by the user, and with the minimum possibility of slipage out of the hands, while at the same time permitting the discharge of a non-turbulent, smooth stream of the fluid contents, substantially regardless of the angle of tilt, such non-turbulent discharge constituting a desirable feature of the invention in the industrial washing already referred to, of the bottle with modern high-speed soaker equipment.

Still another and highly important novel feature of the herein described bottle lies in the provision of a neck structure which, as well as being designed for the purposes aforesaid, has, in addition, been so designed with due regard for the fact that plastic bottles have yieldable body walls, and that standard filler nozzles (which automatically cut off flow when the fluid level reaches them) must project further down into the bottle than is necessary with glass bottles. This is because impact on a flexible plastic bottle wall can cause hydraulic surge, and blow the cap out if filled too full. At the same time it is not desirable that the fluid level be that at which the bottle body widens appreciably, because the milk would then slop around inside, which could be troublesome in multi-bottle truck transport. Among other undesirable effects which a wide low level would have is also consumer reaction to the belief that the bottle was under-filled.

Moreover, plastic bottles are liable to slight permanent shrinkage when washed at appreciably above normal washing temperature (about 150° F.). Such considerations as these have dictated the novel neck configuration herein disclosed, which, in addition to allowing for such shrinkage, and such hydraulic surge, may also, particularly in a non-returnable, single use and even thinner more flexible plastic bottle, distort slightly under hydraulic pressure if well capped, and changes shape slightly from the frusto-conical toward the spheroidal. This accommodates a slightly greater volume without increase of internal neck surface or area, it being understood that ideally, the bottle will be filled up to the midplane, of the throat, where the fluid level is also concealed by the carrying band. Such concealment of a fluctuating level is commercially desirable.

It follows from what has been stated, that still other novel advantages of the herein disclosed invention (particularly combined with what has been disclosed) reside in the fact that (i) since there is a practical limit to the depth to which the milk delivery nozzle can be inserted into a bottle, the neck structure herein is of such configuration as to provide a sealed plenum above the milk level which is of large volume for its height, and (ii) it is capable of resilient yielding or collapsing slightly downwards under the considerable impacts of filler nozzle seatings and closure caps.

With the foregoing considerations in view, and such other objects, purposes or advantages as may become apparent from consideration of this disclosure and specification, the present invention consists of the inventive concept embodied in the method, process, construction, arrangement of parts, or new use of any of the foregoing, as herein particularly exemplified in one or more specific embodiments of such concept, reference being had to the accompanying figure which is a fragmentary side elevation partly sectioned of a plastic milk bottle having the neck structure of the present invention.

The present invention comprises a plastic bottle collectively designated 10. It also comprises, in combination, said bottle and a handle generally designated 11 therefor, the handle embodying a band 12, and carrying means 13 connected to same.

The bottle comprises a body 14 which may be generally circular, or, rectangular as viewed in plan. A neck structure generally designated 15 surmounts the outwardly and downwardly diverging upper part 16 of the body. Neck structure 15 embodies a generally frusto-conical neck 17, an annular throat 18 below said neck, and a finish 19 surmounting said neck, the upper end of said neck being concentrically connected to the finish.

Neck 17 diverges downwardly and outwardly, being connected concentrically to finish 19 in the diameter of the undersurface 20 of the finish, the outer diameter 21 of the finish being greater than that of the apical plane of the undersurface 20.

The base of neck 17 is generally in the form of an annular rondure 22, the maximum diameter of which is approximately equal to, though as illustrated may be slightly less than, the maximum or outer diameter 21 of finish 19. Throat 18 constitutes an annulus of inwardly concave axial cross section, the lower general terminal plane 23 of the throat merging co-terminously with or into the aforesaid upper part 16 of the body of the bottle and the upper general terminal plane 23' of the throat merging co-terminously with the lower portion of the rondure 22. The trough, or plane of deepest recession of throat 18 (indicated by line 24) is of a diameter slightly greater than that of the apical plane of the undersurface 20.

The rondure 22 may also, and is hereby designated as an outwardly convex base of neck 17 of which the main, frusto-conical portion is specifically designated 25 for greater descriptive accuracy.

Band 12 has an inner circumferential surface 26 which conforms substantially to the concavity of throat 18. Finish 19 projects annularly outward around the opening (not shown) of the bottle, and has the planar undersurface 20 disposed normal to the longitudinal bottle axis so as to be capable of supporting said bottle when suspended thereby between a pair of tracks.

The finish 19 is adapted to be sealed by any form of disposable hood such as 28 of foil or wet-strength paper, suitably pleated as a rule, for retention as generally indicated.

If it be desired to employ the disclosed bottle without the handle 11, the bottle may also be suspended by means of a pair of parallel tracks, downwardly depending fingers or the like engageable with trough 18. From the description given, it will, in any event, be apparent that with or without the handle, the disclosed bottle may be very efficiently and securely grasped in the hand or by any machinery without danger of slippage when wet.

The slow internal curvature of the rondure 22 obviously provides for efficient cleaning of the bottle due to the absence of any annular cleft or ridge within which bacteria might lodge and escape removal during such cleaning. The diameter of neck 15 adjacent the undersurface 20 is preferably in the order of 1.198 inches. The distance from the uppermost plane 29 of finish 19 to the trough portion 24 of throat 18 is preferably in the order of 1.125 inches. The diameter of the throat 18 at its trough is approximately 1.600 inches. The diameter of neck 15 on the plane of the maximum diameter of rondure 22 is desirably in the order of 1.844 inches.

The diameter of the upper portion 16 of the bottle, about .75 inch below line 24 is preferably in the order of 2.200 inches.

From all the foregoing it will be apparent that since the interior surface of the bottle substantially conforms in thinness with the outer surface thereof, a plastic bottle, preferably though not necessarily of polyethylene, is provided which functions with a complete absence of excess material, whereby to provide a smooth and hygienic interior flow pattern for milk being admitted and discharged, as well as for the washing fluid employed. At the same time it provides a secure means for fastening a band such as 12. It should also be explained that carrying means 13 connected to band 12 in the embodiment shown, comprises the pair of side straps or hangers 30, the lower ends of which are secured exactly at, or somewhere offset from diametrically opposite points, to band 12, with the bail or handle 31 connecting the distal ends of the straps. However, the specific handle including band does not constitute, alone and of itself a part of the present invention.

There has also been illustrated in phantom lines, the conventional, cylindrical stainless steel nozzle 32 by which means milk bottles are customarily filled. The lower ends of these items are rounded and centrally apertured as at 33. Extending centrally through them is an air escape tube 34, the lower end 35 of which lies in the plane of aperture 33. As a consequence, the effective aperture is annular, and hence milk flows outwardly and into the bottle in an annular flared pattern, as suggested by lines 36. The bottle depicted is intended to be of three-quart volume, although obviously the capacity of same may be varied. However, whatever the size, it is obviously designed to be filled very efficiently with the described nozzle 32, from which milk flows down the inner surface of portion 16 to hit the inner wall surface generally as and where indicated so that no splash-back and consequent head of foam develops, while air discharges efficiently from the base of the bottle, and axially upward through tube 34.

If desired, the elongated skirt 37 of the hood form 38 fragmentarily depicted in phantom lines, may be adhesively attached to the outer surface of the annular rondure 22. In the attachment of such a form of hood of course, the carrying handle must either be dispensed with, or else the side arms 30 thereof held downwardly below the plane of the rondure.

It will be noted that the lower end of nozzle 32, and the air escape tube 34, both terminate on plane 24. This plane is therefore the level to which the bottle will be filled, it being understood that the flow is automatically cut off as soon as the fluid level reaches the indicated plane. There is accordingly provided a substantial plenum within the neck structure above plane 24, between it and finish 19. As already indicated, the conformation of the whole neck structure as from plane 24 (the upper annular edge of band 12) is such as to permit of a reasonable amount of surge within the bottle should it be squeezed temporarily or permanently.

If the finish 19 be really tightly capped against leakage, and quite thin plastic be employed, as would be the case with non-returnable plastic milk bottles as contrasted with returnable or reusable plastic milk bottles, the volume within the neck structure may also be increased slightly by deformation under stress. In other words, should surge or air pressure within the plenum above plane 24 exert pressure upon the closure surrounded by finish 19, the frusto-conical neck 15 may yield outwardly slightly into a spheroidal form to further increase plenum capacity within the same inner surface area. It is also repeated that the design of the neck structure has been such as to reduce height above the plane 24 to the maximum practicable extent.

It will, in addition, be apparent from all the foregoing that a neck structure has been provided having all the advantages herein set forth, and, as a consequence thereof, the sinuous vertically cross-sectional contour disclosed, which, nonetheless also provides for the filling of the bottle without the milk touching any part of the said neck structure per se, but, by contrast, permits milk from the filling nozzles to make direct tangential impact with the said outward and downwardly diverging upper body part 16 in a downward frusto-conical jet form so that fast and effective filling may be achieved.

Various modifications can be made within the scope of the inventive concept disclosed. Accordingly, it is intended that what is set forth herein should be regarded as illustrative of such concept and not for the purpose of limiting protection to any particular embodiment thereof, and that only such limitations should be placed upon the scope of protection to which the inventor hereof is entitled, as justice dictates.

What is claimed is:

1. A plastic bottle including a body with an upper part having upwardly and inwardly extending flattened portions and a neck structure disposed in integral surmounting relation with the flattened portions of said upper part, said neck structure comprising, a finish having a fluid receiving opening therethrough and a generally planar undersurface projecting outwardly from said opening and disposed normal with respect to the longitudinal axis of said bottle, a frusto-conical neck disposed immediately below said finish, said neck having an upper portion which is connected concentrically to and in downwardly and outwardly diverging relation from said finish and a lower base portion which terminates in the form of a generally outwardly convex rondure, the minimum transverse dimension of the upper portion of said neck at its juncture with the undersurface of said finish being less than the maximum transverse dimension of said finish and being less than the outer diameter of said rondure, and a throat disposed immediately and concentrically below said rondure, said throat having a central concave section in axially cross section wtih an upper portion which merges smoothly and convexly with said rondure and a lower portion which curves downwardly and outwardly and which merges co-terminously with said flattened portions of said bottle.

2. A plastic bottle in accordance with claim 1, wherein said throat is of an annular configuration in transverse cross section, and the minimum diameter of said throat being more than the maximum transverse dimension of the upper portion of said neck at its juncture with the undersurface of said finish.

3. A plastic bottle in accordance with claim 2, wherein the minimum diameter of said throat is less than the outer diameter of said rondure.

4. A plastic bottle in accordance with claim 1, wherein the axial distance from the undersurface of said finish to a plane extending transversely through the minimum diameter of said throat is less than the maximum transverse dimension of the upper portion of said neck at its juncture with the said undersurface of said finish.

5. A plastic bottle in accordance with claim 1, wherein said finish is annular in transverse cross section, and the diameter of said finish being approximately equal to the outer diameter of said rondure.

6. A plastic bottle in accordance with claim 1, wherein the concave formation of said throat in the area adjacent its minimum diameter is generally elliptical about a major axis extending generally parallel to the longitudinal axis of said bottle.

7. A plastic bottle in accordance with claim 1, including, in combination, a plastic carrying handle including a band disposed in encompassing relation around said throat, the diametrical cross section of said band conforming in shape with the conformation of said throat so that the inner surface of said band is in substantially surface-to-surface engagement with the confronting outer surface of said throat.

8. A plastic bottle in accordance with claim 7, wherein said band is of a generally elliptical shape in cross section, and the major axis of said band being generally parallel with the longitudinal axis of said bottle.

9. A plastic bottle in accordance with claim 2, wherein the juncture of the upper portion of said neck with said finish has a diameter of approximately 1.198 inches.

10. A plastic bottle in accordance with claim 1, wherein the minimum diameter of said throat is approximately 1.600 inches, the maximum diameter of said rondure is approximately 1.844 inches, and the distance along the axis of said bottle from the uppermost plane of said finish to the minimum diameter of said throat is approximately 1.125 inches.

References Cited

UNITED STATES PATENTS

| | | | |
|---|---|---|---|
| 2,703,253 | 3/1955 | Biederman | 211—74 X |
| 3,013,686 | 12/1961 | Blunt | 215—31 |
| 3,036,371 | 5/1962 | Gray | 215—100 X |
| 3,086,671 | 4/1963 | Zaleski | 215—31 |
| 3,323,670 | 6/1967 | Flack | 215—38 |

DONALD F. NORTON, *Primary Examiner.*